(12) United States Patent
Westerhoff et al.

(10) Patent No.: US 11,514,572 B2
(45) Date of Patent: Nov. 29, 2022

(54) AUTOMATIC IMAGE SEGMENTATION METHODS AND ANALYSIS

(71) Applicant: PME IP PTY LTD, Richmond (AU)

(72) Inventors: Malte Westerhoff, Berlin (DE); Detlev Stalling, Berlin (DE); Martin Seebass, Berlin (DE)

(73) Assignee: PME IP PTY LTD, Richmond (AU)

( * ) Notice: Subject to any disclaimer, the term of this patent is extended or adjusted under 35 U.S.C. 154(b) by 265 days.

(21) Appl. No.: 16/913,808

(22) Filed: Jun. 26, 2020

(65) Prior Publication Data

US 2020/0327669 A1      Oct. 15, 2020

Related U.S. Application Data

(63) Continuation of application No. 15/988,519, filed on May 24, 2018, now Pat. No. 10,706,538, which is a continuation of application No. 15/276,546, filed on Sep. 26, 2016, now Pat. No. 9,984,460, which is a continuation of application No. 14/040,215, filed on Sep. 27, 2013, now Pat. No. 9,454,813, which is a
(Continued)

(51) Int. Cl.
*G06T 7/00* (2017.01)
*G06T 7/11* (2017.01)
*G06V 10/50* (2022.01)
*G06K 9/62* (2022.01)

(52) U.S. Cl.
CPC .......... *G06T 7/0012* (2013.01); *G06K 9/6267* (2013.01); *G06T 7/11* (2017.01); *G06V 10/50* (2022.01); *G06T 2200/04* (2013.01); *G06T 2207/10081* (2013.01); *G06T 2207/20112* (2013.01); *G06T 2207/30008* (2013.01); *G06T 2207/30101* (2013.01)

(58) Field of Classification Search
None
See application file for complete search history.

(56) References Cited

U.S. PATENT DOCUMENTS

| 2,658,310 A | 11/1953 | Cook |
| 3,431,200 A | 3/1969 | Davis |
| 3,645,040 A | 2/1972 | Ort |

(Continued)

FOREIGN PATENT DOCUMENTS

| DE | 10317384 | 4/2004 |
| EP | 0492897 | 7/1992 |

(Continued)

OTHER PUBLICATIONS

ATI Website Index, http://www.ati.com/developer/index.html, Dec. 20, 2002, 2 pages.

(Continued)

*Primary Examiner* — Vu Le
*Assistant Examiner* — Courtney Joan Nelson
(74) *Attorney, Agent, or Firm* — Sci-Law Strategies, PC

(57) ABSTRACT

The invention provides methods and apparatus for image processing that perform image segmentation on data sets in two- and/or three-dimensions so as to resolve structures that have the same or similar grey values (and that would otherwise render with the same or similar intensity values) and that, thereby, facilitate visualization and processing of those data sets.

20 Claims, 8 Drawing Sheets

Related U.S. Application Data continuation of application No. 12/275,862, filed on Nov. 21, 2008, now Pat. No. 8,548,215.

(60) Provisional application No. 60/989,915, filed on Nov. 23, 2007.

(56) References Cited

U.S. PATENT DOCUMENTS

| | | |
|---|---|---|
| 4,137,868 A | 2/1979 | Pryor |
| 4,235,043 A | 11/1980 | Harasawa et al. |
| 4,258,661 A | 3/1981 | Margen |
| 4,267,038 A | 5/1981 | Thompson |
| 4,320,594 A | 3/1982 | Raymond |
| 4,746,795 A | 5/1988 | Stewart et al. |
| 4,905,148 A | 2/1990 | Crawford |
| 4,910,912 A | 3/1990 | Lowrey, III |
| 4,928,250 A | 5/1990 | Greenberg et al. |
| 4,958,460 A | 9/1990 | Nielson et al. |
| 4,984,160 A | 1/1991 | Saint Felix et al. |
| 5,031,117 A | 7/1991 | Minor et al. |
| 5,091,960 A | 2/1992 | Butler |
| 5,121,708 A | 6/1992 | Nuttle |
| 5,128,864 A | 7/1992 | Waggener et al. |
| 5,218,534 A | 6/1993 | Trousset et al. |
| 5,235,510 A | 8/1993 | Yamada |
| 5,241,471 A | 8/1993 | Trousset et al. |
| 5,253,171 A | 10/1993 | Hsiao et al. |
| 5,274,759 A | 12/1993 | Yoshioka |
| 5,280,428 A | 1/1994 | Wu et al. |
| 5,287,274 A | 2/1994 | Saint Felix et al. |
| 5,293,313 A | 3/1994 | Cecil |
| 5,307,264 A | 4/1994 | Waggener et al. |
| 5,355,453 A | 10/1994 | Row et al. |
| 5,368,033 A | 11/1994 | Moshfeghi |
| 5,375,156 A | 12/1994 | Kuo-Petravic et al. |
| 5,412,703 A | 5/1995 | Goodenough et al. |
| 5,412,764 A | 5/1995 | Tanaka |
| 5,442,672 A | 8/1995 | Bjorkholm et al. |
| 5,452,416 A | 9/1995 | Hilton |
| 5,488,700 A | 1/1996 | Glassner |
| 5,560,360 A | 10/1996 | Filler |
| 5,594,842 A | 1/1997 | Kaufman et al. |
| 5,602,892 A | 2/1997 | Llacer |
| 5,633,951 A | 5/1997 | Moshfeghi |
| 5,633,999 A | 5/1997 | Clowes et al. |
| 5,640,436 A | 6/1997 | Kawai et al. |
| 5,671,265 A | 9/1997 | Andress |
| 5,744,802 A | 4/1998 | Muehllehner et al. |
| 5,774,519 A | 6/1998 | Lindstrom et al. |
| 5,790,787 A | 8/1998 | Scott et al. |
| 5,793,374 A | 8/1998 | Guenter et al. |
| 5,793,879 A | 8/1998 | Benn et al. |
| 5,813,988 A | 9/1998 | Alfano et al. |
| 5,821,541 A | 10/1998 | Tumer |
| 5,825,842 A | 10/1998 | Taguchi |
| 5,838,756 A | 11/1998 | Taguchi et al. |
| 5,841,140 A | 11/1998 | McCroskey et al. |
| 5,909,476 A | 6/1999 | Cheng et al. |
| 5,930,384 A | 7/1999 | Guillemaud et al. |
| 5,931,789 A | 8/1999 | Alfano et al. |
| 5,950,203 A | 9/1999 | Stakuis |
| 5,960,056 A | 9/1999 | Lai |
| 5,963,612 A | 10/1999 | Navab |
| 5,963,613 A | 10/1999 | Navab |
| 5,963,658 A | 10/1999 | Klibanov et al. |
| 6,002,739 A | 12/1999 | Heumann |
| 6,018,562 A | 1/2000 | Willson |
| 6,032,264 A | 2/2000 | Beffa et al. |
| 6,044,132 A | 3/2000 | Navab |
| 6,049,390 A | 4/2000 | Notredame |
| 6,049,582 A | 4/2000 | Navab |
| 6,072,177 A | 6/2000 | Mccroskey et al. |
| 6,088,423 A | 7/2000 | Krug et al. |
| 6,091,422 A | 7/2000 | Ouaknine et al. |
| 6,104,827 A | 8/2000 | Benn et al. |
| 6,105,029 A | 8/2000 | Maddalozzo, Jr. et al. |
| 6,108,007 A | 8/2000 | Shochet |
| 6,108,576 A | 8/2000 | Alfano et al. |
| 6,123,733 A | 9/2000 | Dalton |
| 6,175,655 B1 | 1/2001 | George |
| 6,205,120 B1 | 3/2001 | Packer et al. |
| 6,219,061 B1 | 4/2001 | Lauer et al. |
| 6,226,005 B1 | 5/2001 | Laferriere |
| 6,236,704 B1 | 5/2001 | Navab et al. |
| 6,243,098 B1 | 6/2001 | Lauer et al. |
| 6,249,594 B1 | 6/2001 | Hibbard |
| 6,255,655 B1 | 7/2001 | Mc Croskey et al. |
| 6,264,610 B1 | 7/2001 | Zhu |
| 6,268,846 B1 | 7/2001 | Georgiev |
| 6,278,460 B1 | 8/2001 | Myers et al. |
| 6,282,256 B1 | 8/2001 | Grass et al. |
| 6,289,235 B1 | 9/2001 | Webber et al. |
| 6,304,771 B1 | 10/2001 | Yodh et al. |
| 6,320,928 B1 | 11/2001 | Vaillant et al. |
| 6,324,241 B1 | 11/2001 | Besson |
| 6,377,257 B1 | 4/2002 | Borrel |
| 6,377,266 B1 | 4/2002 | Baldwin |
| 6,384,821 B1 | 5/2002 | Borrel |
| 6,404,843 B1 | 6/2002 | Vaillant |
| 6,415,013 B1 | 7/2002 | Hsieh et al. |
| 6,470,067 B1 | 10/2002 | Harding |
| 6,470,070 B2 | 10/2002 | Menhardt |
| 6,473,793 B1 | 10/2002 | Dillon et al. |
| 6,475,150 B2 | 11/2002 | Haddad |
| 6,507,633 B1 | 1/2003 | Elbakri et al. |
| 6,510,241 B1 | 1/2003 | Vaillant et al. |
| 6,519,355 B2 | 2/2003 | Nelson |
| 6,526,305 B1 | 2/2003 | Mori |
| 6,557,102 B1 | 4/2003 | Wong et al. |
| 6,559,958 B2 | 5/2003 | Motamed |
| 6,591,004 B1 | 7/2003 | VanEssen et al. |
| 6,615,063 B1 | 9/2003 | Ntziachristos et al. |
| 6,633,688 B1 | 10/2003 | Nixon |
| 6,636,623 B2 | 10/2003 | Nelson et al. |
| 6,654,012 B1 | 11/2003 | Lauer et al. |
| 6,658,142 B1 | 12/2003 | Kam et al. |
| 6,664,963 B1 | 12/2003 | Zatz |
| 6,674,430 B1 | 1/2004 | Kaufman et al. |
| 6,697,508 B2 | 2/2004 | Nelson |
| 6,707,878 B2 | 3/2004 | Claus et al. |
| 6,718,195 B2 | 4/2004 | Van Der Mark et al. |
| 6,731,283 B1 | 5/2004 | Navab |
| 6,740,232 B1 | 5/2004 | Beaulieu |
| 6,741,730 B2 | 5/2004 | Rahn et al. |
| 6,744,253 B2 | 6/2004 | Stolarczyk |
| 6,744,845 B2 | 6/2004 | Harding et al. |
| 6,745,070 B2 | 6/2004 | Wexler et al. |
| 6,747,654 B1 | 6/2004 | Laksono et al. |
| 6,754,299 B2 | 6/2004 | Patch |
| 6,765,981 B2 | 7/2004 | Heumann |
| 6,768,782 B1 | 7/2004 | Hsieh et al. |
| 6,770,893 B2 | 8/2004 | Nelson |
| 6,771,733 B2 | 8/2004 | Katsevich |
| 6,778,127 B2 | 8/2004 | Stolarczyk et al. |
| 6,785,409 B1 | 8/2004 | Suri |
| 6,798,417 B1 | 9/2004 | Taylor |
| 6,807,581 B1 | 10/2004 | Starr et al. |
| 6,825,840 B2 | 11/2004 | Gritz |
| 6,825,843 B2 | 11/2004 | Allen et al. |
| 6,923,906 B2 | 8/2005 | Oswald et al. |
| 6,947,047 B1 | 9/2005 | Moy et al. |
| 6,978,206 B1 | 12/2005 | Pu |
| 7,003,547 B1 | 2/2006 | Hubbard |
| 7,006,101 B1 | 2/2006 | Brown et al. |
| 7,031,022 B1 | 4/2006 | Komori et al. |
| 7,034,828 B1 | 4/2006 | Drebin et al. |
| 7,039,723 B2 | 5/2006 | Hu |
| 7,050,953 B2 | 5/2006 | Chiang et al. |
| 7,054,852 B1 | 5/2006 | Cohen |
| 7,058,644 B2 | 6/2006 | Patchet et al. |
| 7,076,735 B2 | 7/2006 | Callegari |
| 7,098,907 B2 | 8/2006 | Houston et al. |
| 7,120,283 B2 | 10/2006 | Thieret |
| 7,133,041 B2 | 11/2006 | Kaufman et al. |

(56) References Cited

U.S. PATENT DOCUMENTS

| | | |
|---|---|---|
| 7,154,985 B2 | 12/2006 | Dobbs |
| 7,167,176 B2 | 1/2007 | Sloan et al. |
| 7,184,041 B2 | 2/2007 | Heng et al. |
| 7,185,003 B2 | 2/2007 | Bayliss et al. |
| 7,219,085 B2 | 5/2007 | Buck et al. |
| 7,242,401 B2 | 7/2007 | Yang et al. |
| 7,262,770 B2 | 8/2007 | Sloan et al. |
| 7,274,368 B1 | 9/2007 | Keslin |
| 7,299,232 B2 | 11/2007 | Stakutis et al. |
| 7,315,926 B2 | 1/2008 | Fridella et al. |
| 7,324,116 B2 | 1/2008 | Boyd et al. |
| 7,339,585 B2 | 3/2008 | Verstraelen et al. |
| 7,472,156 B2 | 12/2008 | Philbrick et al. |
| 7,502,869 B2 | 3/2009 | Boucher et al. |
| 7,506,375 B2 | 3/2009 | Kanda et al. |
| 7,552,192 B2 | 6/2009 | Carmichael |
| 7,609,884 B1 | 10/2009 | Stalling |
| 7,693,318 B1 | 4/2010 | Stalling |
| 7,701,210 B2 | 4/2010 | Ichinose |
| 7,778,392 B1 | 8/2010 | Bergman |
| 7,876,944 B2 | 1/2011 | Stalling |
| 7,889,895 B2 | 2/2011 | Nowinski |
| 7,899,516 B2 | 3/2011 | Chen et al. |
| 7,907,759 B2 | 3/2011 | Hundley |
| 7,956,612 B2 | 6/2011 | Sorensen |
| 7,983,300 B2 | 7/2011 | Vaughan et al. |
| 7,991,837 B1 | 8/2011 | Tahan |
| 7,995,824 B2 | 8/2011 | Yim |
| 8,107,592 B2 | 1/2012 | Bergman |
| 8,189,002 B1 | 5/2012 | Westerhoff |
| 8,319,781 B2 | 11/2012 | Westerhoff |
| 8,369,600 B2 | 2/2013 | Can et al. |
| 8,386,560 B2 | 2/2013 | Ma |
| 8,392,529 B2 | 3/2013 | Westerhoff |
| 8,508,539 B2 | 8/2013 | Vlietinck |
| 8,538,108 B2 | 9/2013 | Shekhar |
| 8,542,136 B1 | 9/2013 | Owsley et al. |
| 8,548,215 B2 | 10/2013 | Westerhoff |
| 8,775,510 B2 | 7/2014 | Westerhoff |
| 8,976,190 B1 | 3/2015 | Westerhoff |
| 9,019,287 B2 | 4/2015 | Westerhoff |
| 9,167,027 B2 | 10/2015 | Westerhoff |
| 9,299,156 B2 | 3/2016 | Zalis |
| 9,355,616 B2 | 5/2016 | Westerhoff |
| 9,454,813 B2 | 9/2016 | Westerhoff |
| 9,509,802 B1 | 11/2016 | Westerhoff |
| 9,524,577 B1 | 12/2016 | Westerhoff |
| 9,531,789 B2 | 12/2016 | Westerhoff |
| 9,595,242 B1 | 3/2017 | Westerhoff |
| 9,728,165 B1 | 8/2017 | Westerhoff |
| 9,749,245 B2 | 8/2017 | Stalling |
| 9,860,300 B2 | 1/2018 | Westerhoff |
| 9,898,855 B2 | 2/2018 | Westerhoff |
| 9,904,969 B1 | 2/2018 | Westerhoff |
| 9,984,460 B2 | 5/2018 | Westerhoff |
| 9,984,478 B2 | 5/2018 | Westerhoff |
| 10,038,739 B2 | 7/2018 | Westerhoff |
| 10,043,482 B2 | 8/2018 | Westerhoff |
| 10,070,839 B2 | 9/2018 | Westerhoff |
| 10,311,541 B2 | 6/2019 | Westerhoff |
| 10,320,684 B2 | 6/2019 | Stalling |
| 10,373,368 B2 | 8/2019 | Westerhoff |
| 10,380,970 B2 | 8/2019 | Westerhoff |
| 10,395,398 B2 | 8/2019 | Westerhoff |
| 10,430,914 B2 | 10/2019 | Westerhoff |
| 10,540,803 B2 | 1/2020 | Westerhoff |
| 10,614,543 B2 | 4/2020 | Westerhoff |
| 10,631,812 B2 | 4/2020 | Westerhoff |
| 10,686,868 B2 | 6/2020 | Westerhoff |
| 10,706,538 B2 | 7/2020 | Westerhoff |
| 2001/0026848 A1 | 10/2001 | Van Der Mark |
| 2002/0010551 A1* | 1/2002 | Wang ............ G06T 5/008 702/19 |
| 2002/0016813 A1 | 2/2002 | Woods et al. |
| 2002/0034817 A1 | 3/2002 | Henry et al. |
| 2002/0049825 A1 | 4/2002 | Jewett et al. |
| 2002/0080143 A1 | 6/2002 | Morgan et al. |
| 2002/0089587 A1 | 7/2002 | White et al. |
| 2002/0099290 A1 | 7/2002 | Haddad |
| 2002/0099844 A1 | 7/2002 | Baumann et al. |
| 2002/0120727 A1 | 8/2002 | Curley et al. |
| 2002/0123680 A1 | 9/2002 | Vailant |
| 2002/0138019 A1 | 9/2002 | Wexler |
| 2002/0150202 A1 | 10/2002 | Harding |
| 2002/0150285 A1 | 10/2002 | Nelson |
| 2002/0180747 A1 | 12/2002 | Lavelle et al. |
| 2002/0184238 A1 | 12/2002 | Chylla |
| 2002/0184349 A1 | 12/2002 | Manukyan |
| 2003/0001842 A1 | 1/2003 | Munshi |
| 2003/0031352 A1 | 2/2003 | Nelson et al. |
| 2003/0059110 A1 | 3/2003 | Wilt |
| 2003/0065268 A1 | 4/2003 | Chen et al. |
| 2003/0086599 A1 | 5/2003 | Armato |
| 2003/0103666 A1 | 6/2003 | Edie et al. |
| 2003/0120743 A1 | 6/2003 | Coatney et al. |
| 2003/0123720 A1 | 7/2003 | Launav et al. |
| 2003/0149812 A1 | 8/2003 | Schoenthal et al. |
| 2003/0158786 A1 | 8/2003 | Yaron |
| 2003/0176780 A1* | 9/2003 | Arnold ............ G06T 7/62 600/407 |
| 2003/0179197 A1 | 9/2003 | Sloan et al. |
| 2003/0194049 A1 | 10/2003 | Claus et al. |
| 2003/0220569 A1 | 11/2003 | Dione |
| 2003/0220772 A1 | 11/2003 | Chiang et al. |
| 2003/0227456 A1 | 12/2003 | Gritz |
| 2003/0234791 A1 | 12/2003 | Boyd et al. |
| 2004/0010397 A1 | 1/2004 | Barbour et al. |
| 2004/0012596 A1 | 1/2004 | Allen et al. |
| 2004/0015062 A1 | 1/2004 | Ntziachristos et al. |
| 2004/0022348 A1 | 2/2004 | Heumann |
| 2004/0059822 A1 | 3/2004 | Jiang |
| 2004/0066384 A1 | 4/2004 | Ohba |
| 2004/0066385 A1 | 4/2004 | Kilgard |
| 2004/0066891 A1 | 4/2004 | Freytag |
| 2004/0078238 A1 | 4/2004 | Thomas et al. |
| 2004/0101183 A1* | 5/2004 | Mullick ............ G06T 7/49 382/131 |
| 2004/0102688 A1 | 5/2004 | Walker |
| 2004/0125103 A1 | 7/2004 | Kaufman |
| 2004/0133652 A1 | 7/2004 | Miloushev et al. |
| 2004/0147039 A1 | 7/2004 | Van Der Mark |
| 2004/0162677 A1 | 8/2004 | Bednar |
| 2004/0170302 A1 | 9/2004 | Museth et al. |
| 2004/0210584 A1 | 10/2004 | Nir et al. |
| 2004/0215858 A1 | 10/2004 | Armstrong et al. |
| 2004/0215868 A1 | 10/2004 | Solomon et al. |
| 2004/0239672 A1 | 12/2004 | Schmidt |
| 2004/0240753 A1 | 12/2004 | Hu |
| 2005/0012753 A1 | 1/2005 | Karlov |
| 2005/0017972 A1 | 1/2005 | Poole et al. |
| 2005/0066095 A1 | 3/2005 | Mullick et al. |
| 2005/0088440 A1 | 4/2005 | Sloan et al. |
| 2005/0128195 A1 | 6/2005 | Houston et al. |
| 2005/0152590 A1 | 7/2005 | Thieret |
| 2005/0165623 A1 | 7/2005 | Landi et al. |
| 2005/0225554 A1 | 10/2005 | Bastos et al. |
| 2005/0228272 A1* | 10/2005 | Yu ............ A61B 6/466 600/407 |
| 2005/0231503 A1 | 10/2005 | Heng et al. |
| 2005/0239182 A1 | 10/2005 | Berzin |
| 2005/0240628 A1 | 10/2005 | Jiang et al. |
| 2005/0256742 A1 | 11/2005 | Kohan et al. |
| 2005/0259103 A1 | 11/2005 | Kilgard et al. |
| 2005/0270298 A1 | 12/2005 | Thieret |
| 2005/0271302 A1 | 12/2005 | Khamene et al. |
| 2006/0010438 A1 | 1/2006 | Brady et al. |
| 2006/0010454 A1 | 1/2006 | Napoli et al. |
| 2006/0028479 A1 | 2/2006 | Chun |
| 2006/0034511 A1 | 2/2006 | Verstraelen |
| 2006/0066609 A1 | 3/2006 | Iodice |
| 2006/0197780 A1 | 9/2006 | Watkins et al. |
| 2006/0214949 A1 | 9/2006 | Zhang |
| 2006/0239540 A1 | 10/2006 | Serra |
| 2006/0239589 A1 | 10/2006 | Omernick |

(56) References Cited

U.S. PATENT DOCUMENTS

| | | |
|---|---|---|
| 2006/0282253 A1 | 12/2006 | Buswell et al. |
| 2007/0005798 A1 | 1/2007 | Gropper et al. |
| 2007/0038939 A1 | 2/2007 | Challen |
| 2007/0046966 A1 | 3/2007 | Mussack |
| 2007/0067497 A1 | 3/2007 | Craft et al. |
| 2007/0092864 A1* | 4/2007 | Reinhardt ................. G06T 7/11 600/300 |
| 2007/0097133 A1 | 5/2007 | Stauffer et al. |
| 2007/0116332 A1 | 5/2007 | Cai et al. |
| 2007/0127802 A1 | 6/2007 | Odry |
| 2007/0156955 A1 | 7/2007 | Royer, Jr. |
| 2007/0165917 A1 | 7/2007 | Cao et al. |
| 2007/0185879 A1 | 8/2007 | Roublev et al. |
| 2007/0188488 A1 | 8/2007 | Choi |
| 2007/0226314 A1 | 9/2007 | Eick et al. |
| 2007/0255704 A1 | 11/2007 | Baek et al. |
| 2007/0280518 A1 | 12/2007 | Nowinski |
| 2008/0009055 A1 | 1/2008 | Lewnard |
| 2008/0042923 A1 | 2/2008 | De Laet |
| 2008/0086557 A1 | 4/2008 | Roach |
| 2008/0115139 A1 | 5/2008 | Inglett et al. |
| 2008/0137929 A1 | 6/2008 | Chen et al. |
| 2008/0147554 A1 | 6/2008 | Stevens et al. |
| 2008/0155890 A1 | 7/2008 | Oyler |
| 2008/0174593 A1 | 7/2008 | Ham |
| 2008/0208961 A1 | 8/2008 | Kim et al. |
| 2008/0224700 A1 | 9/2008 | Sorensen |
| 2008/0281908 A1 | 11/2008 | McCanne et al. |
| 2008/0317317 A1 | 12/2008 | Shekhar |
| 2009/0005693 A1 | 1/2009 | Brauner et al. |
| 2009/0043988 A1 | 2/2009 | Archer et al. |
| 2009/0077097 A1 | 3/2009 | Lacapra et al. |
| 2009/0147793 A1 | 6/2009 | Hayakawa et al. |
| 2009/0208082 A1 | 8/2009 | Westerhoff et al. |
| 2009/0210487 A1 | 8/2009 | Westerhoff et al. |
| 2009/0225076 A1 | 9/2009 | Vlietinck |
| 2009/0245610 A1 | 10/2009 | Can et al. |
| 2009/0313170 A1 | 12/2009 | Goldner et al. |
| 2010/0054556 A1 | 3/2010 | Novatzky |
| 2010/0060652 A1 | 3/2010 | Karlsson |
| 2010/0123733 A1 | 5/2010 | Zaharia |
| 2010/0174823 A1 | 7/2010 | Huang |
| 2010/0272342 A1 | 10/2010 | Berman et al. |
| 2010/0278405 A1 | 11/2010 | Kakadiaris et al. |
| 2011/0044524 A1 | 2/2011 | Wang et al. |
| 2011/0112862 A1 | 5/2011 | Yu |
| 2012/0078088 A1 | 3/2012 | Whitestone et al. |
| 2012/0226916 A1 | 9/2012 | Hahn |
| 2012/0233153 A1 | 9/2012 | Roman et al. |
| 2013/0176319 A1 | 7/2013 | Westerhoff |
| 2013/0195329 A1 | 8/2013 | Canda |
| 2015/0213288 A1 | 7/2015 | Bilodeau et al. |
| 2016/0012181 A1 | 1/2016 | Massey |
| 2017/0011514 A1 | 1/2017 | Westerhoff |
| 2017/0346883 A1 | 3/2017 | Westerhoff |
| 2017/0098329 A1 | 4/2017 | Westerhoff |
| 2017/0104811 A1 | 4/2017 | Westerhoff |
| 2017/0178593 A1 | 6/2017 | Westerhoff |
| 2019/0318512 A1 | 10/2019 | Westerhoff |

FOREIGN PATENT DOCUMENTS

| | | |
|---|---|---|
| EP | 0502187 | 9/1992 |
| EP | 0611181 | 8/1994 |
| EP | 0476070 | 8/1996 |
| EP | 0925556 | 6/1999 |
| EP | 0953943 | 11/1999 |
| EP | 0964 366 | 12/1999 |
| EP | 187340 | 3/2001 |
| EP | 2098895 | 9/2009 |
| EP | 2098994 | 9/2009 |
| EP | 2405344 | 1/2012 |
| WO | WO9016072 | 12/1990 |
| WO | WO9102320 | 2/1991 |
| WO | WO9205507 | 4/1992 |
| WO | WO9642022 | 12/1996 |
| WO | WO9810378 | 3/1998 |
| WO | WO9812667 | 3/1998 |
| WO | WO9833057 | 7/1998 |
| WO | WO0120546 | 3/2001 |
| WO | WO0134027 | 5/2001 |
| WO | WO0163561 | 8/2001 |
| WO | WO0174238 | 10/2001 |
| WO | WO0185022 | 11/2001 |
| WO | WO0241760 | 5/2002 |
| WO | WO02067201 | 8/2002 |
| WO | WO02082065 | 10/2002 |
| WO | WO03061454 | 7/2003 |
| WO | WO03088133 | 10/2003 |
| WO | WO03090171 | 10/2003 |
| WO | WO03098539 | 11/2003 |
| WO | WO04019782 | 3/2004 |
| WO | WO04020996 | 3/2004 |
| WO | WO04020997 | 3/2004 |
| WO | WO04034087 | 4/2004 |
| WO | WO04044848 | 5/2004 |
| WO | WO04066215 | 8/2004 |
| WO | WO04072906 | 8/2004 |
| WO | WO05071601 | 8/2005 |
| WO | WO09029636 | 3/2009 |
| WO | WO09067675 | 5/2009 |
| WO | WO09067680 | 5/2009 |
| WO | WO11065929 | 6/2011 |
| WO | WO2015063188 | 5/2015 |

OTHER PUBLICATIONS

Boone et al., Recognition of Chest Radiograph Orientation for Picture Archiving and Communications Systems Display Using Neural Networks, J. Digital Imaging, 1992, 5(3), 190-193.

Boone et al., Automated Recognition of Lateral from PA Chest Radiographs: Saving Seconds in a PACS Environment, J. Digital Imaging, 2003, 16(4), 345-349.

Luo et al., Automatic Image Hanging Protocol for Chest Radiographs in a PACS, IEEE Transactions on Information Technology in Biomedicine, 2006, 10(2), 302-311.

Cabral et al., Accelerated Volume Rendering and Tomographic Reconstruction Using Texture Mapping Hardware., Silicon Graphics Computer Systems, 1995 IEEE, DD. 91-97.

Carr, Nathan A., Jesse D. Hall, John C. Hart, the ray engine, Proceedings of the ACM SIGGRAPH/EUROGRAPHICS conference on Graphics hardware, Sep. 1-2, 2002, pp. 37-46.

Chidlow, et al, Rapid Emission Tomography Reconstruction, Proceedings of the 2003 Eurographics/IEEE TVCG Workshop on Volume Graphics, Tokyo, Japan, Jul. 7-8, 2003, 13 pages.

Cohen, Michael, et al., A Progressive Refinement Approach to Fast Radiosity Image Generation, Computer Graphics, vol. 22, No. 4, Aug. 1988, pp. 75-84.

Corner, B., University of Nebraska—Lincoln, MatLab.txt, 2003, 1 page.

Dachille, et al., High-Quality Volume Rendering Using Texture Mapping Hardware, Siggraph/Eurographics Hardware Workshop (1998) (8 pages).

Dempster, et al., Maximum Likelihood From Incomplete Data Via The EM Algorithm, Harvard University and Educational Testing Service, Dec. 8, 1976, pp. 1-38.

Dennis, C, et al.,, Overview of X-Ray Computed Tomography, http://www.howstuffworks.com/framed.htm?parent=c...tm&url=http://www.ctlab.geo.utexas.edu/overview/, Dec. 26, 2002, 5 pages.

Dobbins, et al., Digital X-Ray Tomosynthesis: Current State of the Art and Clinical Potential, Physics in Medicine and Biology, vol. 48, pp. R65-R106 (2003).

Doggett, Michael, ATI, Programmability Features of Graphics Hardware, (paper) Apr. 23, 2002, pp. C1-C22.

Doggett, Michael, ATI, Programmability Features of Graphics Hardware, (slideshow) slides 1-62 31 pages.

Du, H., Sanchez-Elez, M., Tabrizi, N., Bagherzadeh, N., Anido, M. L., and Fernandez, M. 2003. Interactive ray tracing on reconfigur-

(56) References Cited

OTHER PUBLICATIONS able SIMD MorphoSys. In Proceedings of the 2003 Conference on Asia South Pacific Design Automation (Kitakyushu, Japan, Jan. 21-24, 2003). ASPDAC. ACM, New York, NY, 471-476.

Eldridge Matthew, Homan lgehy, Pat Hanrahan, Pomegranate: a fully scalable graphics architecture, Proceedings of the 27th annual conference on Computer graphics and interactive techniques, p. 443-454, Jul. 2000.

Fang, L., et al., Fast Maximum Intensity Projection Algorithm Using Shear Warp Factorization and Reduced Resampling, Mangetic Resonance in Medicine 47:696-700 (2002).

Filtered Backprojection Reconstruction, http://www.physics.ubd.ca/-mirg/home/tutorial/fbDrecon.html, 216/2003, 5 pages.

Goddard et al., High-speed cone-beam reconstruction: an embedded systems approach, 2002, SPIE vol. 4681, pp. 483-491.

Grass et al., Three-dimensional reconstruction of high contrast objects using C-arm image intensifier projection data, 1999, Computerized Medical Imaging and Graphics, 23, pp. 311-321.

Hadwiger, Markus, et al., Hardware-Accelerated High-Quality Reconstruction of Volumetric Data on PC Graphics Hardware, VRVis Research Center, Vienna, Austria, and Institute of Computer Graphics and Algorithms, Vienna University of Technology, Austria, 9 pages.

Hastreiter et al. (Integrated registration and visualization of medical image data, Proc. Computer Graphics International, Jun. 22-26, 1998, pp. 78-85).

Hopf, M., Ertl, T., Accelerating 3d Convolution Using Graphics Hardware, Proc. IEEE Visualization, 1999, 5 pages.

Hudson, et al., Accelerated Image Reconstruction Using Ordered Subsets of Projection Data, IEEE Transactions on Medical Imaging, vol. 13, No. 4, Dec. 1994, pp. 601-609.

Image Registration Slideshow, 105 pages.

Iterative definition, Merriam-Webster on-line dictionary, printed Aug. 26, 2010, 3 pages.

Jain, Anju, A Programmable Graphics Chip, pcquest.com, Jun. 18, 2001.

Jones et al., Positron Emission Tomographic Images and Expectation Maximization: A VLSI Architecture for Multiple Iterations Per Second, Computer Technology and Imaging, Inc., 1988 IEEE, pp. 620-624.

Kajiya, J. T., Ray tracing volume densities, Proc. Siggraph, Jul. 1984, Computer Graphics, vol. 18, No. 3, pp. 165-174.

Karlsson, Filip; Ljungstedt, Carl Johan; Ray tracing fully implemented on programmable graphics hardware, Master's Thesis, Chalmers University of Technology, Dept. of Computer Engineering, Goteborg, Sweden, copyright© 2004, 29 pages.

Kruger J. and R. Westermann, Acceleration Techniques for GPU-based Volume Rendering, Proceedings of IEEE Visualization, 2003, 6 pages.

Lange et al., EM Reconstruction Algorithms for Emission and Transmission Tomography, J Computer Assisted Tomography 8, DD. 306, et seq. (1984).

Lange et al., Globally Convergent Algorithms for Maximum a Posteriori Transmission Tomography, IEEE Transactions on Image Processing, Vo. 4, No. 10, Oct. 1995, pp. 1430-1438.

Li et al., Tomographic Optical Breast Imaging Guided by Three-Dimensional Mammography, Applied Optics, Sep. 1, 2003, vol. 42, No. 25, pp. 5181-5190.

Li, et al., A Brick Caching Scheme for 30 Medical Imaging, Apr. 15-18, 2004, IEEE International Symposium on Biomedical Imaging: Macro to Nano 2004, vol. 1, pp. 563-566.

Maes, et al. Multimodality Image Registration by Maximization of Mutual Information, IEEE Tran. on Medical Imaging, vol. 16, No. 2, Apr. 1997. pp. 187-198).

Max, N., Optical Models for Direct Volume Rendering, IEEE Transactions on Visualization and Computer Graphics, Jun. 1995, 1(2): pp. 99-108.

McCool, M. et al., Shader Algebra, 2004, pp. 787-795.

McCool, Michael J., Smash: A Next-Generation API for Programmable Graphics Accelerators, Technical Report CS-200-14, Computer Graphics Lab Dept. of Computer Science, University of Waterloo, Aug. 1, 2000.

Microsoft, Architectural Overview Direct for 3D, http://msdn.microsoft.com/library/default.asp?url=/library/en-us/dx8_c/directx_cpp/Graphics/ProgrammersGuide/GettingStarted/Architecture, 12120/2002, 22 pages.

Mitchell, Jason L., RadeonTM 9700 Shading, SIGGRAPH 2002—State of the Art in Hardware Shading Course Notes, DD.3.1-1-3.1-39, 39 pages.

Mitschke et al., Recovering the X-ray projection geometry for three-dimensional tomographic reconstruction with additional sensors: Attached camera versus external navigation system, 2003, Medical Image Analysis, vol. 7, pp. 65-78.

Mueller, K., and R. Yagel, Rapid 3-D Cone Beam Reconstruction With the Simultaneous Algebraic Reconstruction Technique (SART) Using 2-D Texture Mapping Hardware, IEEE Transactions on Medical Imaging, Dec. 2000, 19(12): pp. 1227-1237.

Navab, N., et al., 3D Reconstruction from Projection Matrices in a C-Arm Based 3D-Angiography System, W.M. Wells e al., eds., MICCAI'98, LNCS 1496, pp. 119-129, 1998.

Parker, S., et al., Interactive Ray Tracing for Isosurface rendering, IEEE, 1998, pp. 233-258.

PCT/US2008/084282, Preliminary and International Search Reports, dated May 11, 2011, 7 pages.

PCT/US2005/000837, Preliminary and International Search Reports, dated May 11, 2005, 7 pages.

PCT/US2008/74397, Preliminary and International Search Reports, dated Dec. 3, 2008 , 7 pages.

PCT/US2008/84368, Preliminary and International Search Reports, dated Jan. 13, 2009, 7 pages.

PCT/EP2016/067886, Preliminary and International Search Reports, dated Jan. 17, 2017, 18 pages.

PCT/EP2018/075744, Preliminary and International Search Reports, dated Feb. 1, 2019, 17 pages.

PCT/US2008/84376, Preliminary and International Search Reports, dated Jan. 12, 2009, 6 pages.

JP2018-524544, Office Action, dated Jun. 2, 2020, 4 pages (& English translation).

EP3329405, Office Action, dated Apr. 6, 2020, 5 pages.

Pfister, H., et. al., The VolumePro real-time ray-casting System, Computer Graphics Proceedings of SIGGRAPH), Aug. 1999, No. 251-260.

Phong, B. T. Illumination for Computer Generated Pictures, Communications of the ACM, 18(6), Jun. 1975, pp. 311-317.

Porter, D. H. 2002. Volume Visualization of High Resolution Data using PC-Clusters. Tech. rep., University of Minnesota. Available at http://www.lcse.umn.edu/hvr/pc_vol_rend_L.pdf.

Potmesil, M. and Hoffert, E. M. 1989. The pixel machine: a parallel image computer. In Proceedings of the 16th Annual Conference on Computer Graphics and interactive Techniques SIGGRAPH '89. ACM, New York, NY, 69-78.

Purcell, T., et al., Real-time Ray Tracing on Programmable Graphics Hardware, Department of Computer Science, Stanford University, Stanford, CA, Submitted for review to SIGGRAPH 2002, 2002. http://graphics.stanford.edu/papers/rtongfx/rtongfx_submit.pdf.

Purcell, T., et. al., Ray tracings on Programmable Graphics Hardware, Computer Graphics (Proceedings of SIGGRAPH), 1998, pp. 703-712.

Purcell, Timothy J., Craig Donner, Mike Cammarano , Henrik Wann Jensen , Pat Hanrahan, Photon mapping on programmable graphics hardware, Proceedings of the ACM SIGGRAPH/EUROGRAPHICS conference on Graphics hardware, Jul. 26-27, 2003, 11 pages.

Ramirez et al. (Prototypes stability analysis in the design of a binning strategy for mutual information based medical image registration, IEEE Annual Meeting of the Fuzzy Information, Jun. 27-30, 2004, vol. 2, pp. 862-866.

Rib Cage Projection, downloaded from http://www.colorado.edu/physics/2000/tomography/final_rib_cage.html on Dec. 26, 2002, 3 pages.

(56) References Cited

OTHER PUBLICATIONS

Roettger, Stefan, et al., Smart Hardware-Accelerated Volume Rendering, Joint EUROGRAPHICS—IEEE TCVG Symposium on Visualization, 2003, pp. 231-238, 301.

Sandborg, Michael, Computed Tomography: Physical principles and biohazards, Department of Radiation Physics, Faculty of Health Sciences, Linkoping University, Sweden, Report 81 ISSN 1102-1799, Sep. 1995 ISRN ULI-RAD-R--81--SE, 18 pages.

Sarrut et al. (Fast 30 Image Transformations for Registration Procedures, Proc. Int. Conf. on Image Analysis and Processing, Sep. 27-29, 1999, pp. 446-451.

Selldin, Hakan, Design and Implementation of an Application Programming Interface for Volume Rendering, Linkopings Universitet.

Shekhar, R.; Zagrodsky, V., Cine MPR: interactive multiplanar reformatting of four-dimensional cardiac data using hardware-accelerated texture mapping, IEEE Transactions on Information Technology in Biomedicine, vol. 7, No. 4, pp. 384-393, Dec. 2003.

Silver, et al., Determination and correction of the wobble of a C-arm gantry, Medical Imaging 2000: Image Processing, Kenneth M. Hanson, ed., Proceedings of SPIE vol. 3970 (2000).

Stevens, Grant, et al., Alignment of a Volumetric Tomography System, Med. Phys., 28 (7), Jul. 2001.

Tao, W., Tomographic mammography using a limited number of low dose cone beam projection images, Medical Physics, AIP, Melville, NY vol. 30, pp. 365-380, Mar. 2003, ISSN: 0094-2405.

Tasdizen, T. , Ross Whitaker, Paul Burchard , Stanley Osher, Geometric surface processing via normal maps, ACM Transactions on Graphics (TOG), v.22 n. 4, p. 1012-1033, Oct. 2003.

Tasdizen, T.; Whitaker, R.; Burchard, P.; Osher, S.; Geometric surface smoothing via anisotropic diffusion of normals, IEEE Visualization, VIS 2002, Nov. 2002, pp. 125-132.

Technical Brief: NVIDIA nfiniteFX Engine: Programmable Pixel Shaders, NVIDIA Corporation, 5 pages.

Technical Brief: NVIDIA nfiniteFX Engine: Programmable Vertex Shaders, NVIDIA Corporation, 12 pages.

Viola, I, et al., Hardware Based Nonlinear Filtering and Segmentation Using High Level Shading Languages, Technical Report TR-186-2-03-07, May 2003, 8 pages.

Viola, P., Alignment by Maximization of Mutual Information, PhD Thesis MIT (Also Referred to As—A1 Technical report No. 1548), MIT Artificial Intelligence Lab, Jun. 1, 1995, pp. 1-29.

Weiler, M, M. Kraus and T. Ertl, Hardware-Based View-Independent Cell Projection, Proceedings IEEE Symposium on Volume Visualization 2002, pp. 13-22.

Weiler, M. et al., Hardware-based ray casting for tetrahedral meshes, IEEE Visualization, VIS 2003, Oct. 24-24, 2003, pp. 333-340.

Weiler, M. et al., Hardware-Based view-Independent Cell Projection, IEEE, 2002, pp. 13-22.

Weiskopf, D., T. Schathitzel, T. Ertl, GPU-Based Nonlinear Ray Tracing, EUROGRAPHICS, vol. 23, No. 3, Aug. 2004.

Wen, Junhai; Zigang Wang; Bin Li; Zhengrong Liang; An investigation on the property and fast implementation of a ray-driven method for inversion of the attenuated Radon transform with variable focusing fan-beam collimators, 2003 IEEE Nuclear Science Symposium Conference Record, vol. 3, Oct. 19-25, 2003, pp. 2138-2142.

Wikipedia, Anonymous, 'Volume Rendering' May 30 2015, retrieved Nov. 4 2016, https://en.wikipedia.org/w/index.php?title=Volume_rendering&oldid=664765767.

Wikipedia, Anonymous, 'Tomographic Reconstruction' Dec. 6 2014, retrieved Nov. 4 2016, https://en.wikipedia.org/w/index.php?title=Tomographic_Reconstruction&oldid=636925688.

Wu et al., Tomographic Mammography Using a Limited Number of Low-dose Conebeam Projection Images, Med. Phys., pp. 365-380 (2003).

Xu et al., Toward a Unified Framework for Rapid 30 Computed Tomography on Commodity GPUs, Oct. 19-25, 2003, IEEE Nuclear Science Symposium Conference 2003, vol. 4, pp. 2757-2759.

Xu et al., Ultra-fast 30 Filtered Backprojection on Commodity Graphics Hardware, Apr. 1-18, 2004, IEEE International symposium on Biomedical Imaging: Macro to Nano, vol. 1, pp. 571-574 and corresponding power point presentation.

\* cited by examiner

AUTOMATIC IMAGE SEGMENTATION METHODS AND ANALYSIS

PRIORITY CLAIM

This application is a continuation of (1) U.S. application Ser. No. 15/988,519 filed May 24, 2018, which claims priority to (2) U.S. application Ser. No. 15/276,546 filed Sep. 26, 2016, which issued May 29, 2018 as U.S. Pat. No. 9,984,460 and claims priority to (3) U.S. application Ser. No. 14/040,215 filed Sep. 27, 2013, which issued Sep. 27, 2016 as U.S. Pat. No. 9,454,813 and claims priority to (4) U.S. application Ser. No. 12/275,862 filed Nov. 21, 2008 which issued Oct. 1, 2013 as U.S. Pat. No. 8,548,215 and claims the benefit of priority of (5) U.S. Provisional Patent Application Ser. No. 60/989,915, filed Nov. 23, 2007; the teachings of (1)-(5) are explicitly incorporated herein by reference in their entireties and for all purposes.

BACKGROUND OF THE INVENTION

The invention pertains to digital data processing and, more particularly, to the visualization of image data. It has application, by way of non-limiting example, in medical imaging, microscopy, geophysics, non-destructive testing.

Data sets in diagnostic medical imaging and other disciplines such as microscopy, geo-physics, non destructive testing etc., are growing in size and number. Efficient visualization methods are therefore increasingly important to enable clinicians, researchers and others to analyze digital image data. Image segmentation and the extraction of structures from images for visualization and analysis can be helpful for this purpose.

Image segmentation is an automated technique that facilitates distinguishing objects and other features in digital images. The technique can be used, for example, to simplify digitized images so that they can be more readily interpreted by computers (e.g., image analysis software) and/or by their users. Thus, for example, image segmentation can be used to simplify a digitized x-ray image of a patient who has consumed a barium "milkshake." In its original form, such an image is made up of pixels containing a wide range of undifferentiated intensity values that—although, possibly recognizable to the human eye as skeletal bones and digestive tract—are largely uninterpretable by a computer.

Image segmentation can remedy this by categorizing as being of potential interest (e.g., "not background") all pixels of a selected intensity range—typically, all intensities above a threshold value. Alternatively, image segmentation can rely on finding all edges or borders in the image. A related, but still further alternative technique, is to identify all "connected components"—i.e., groupings of adjacent pixels in the image of the same, or similar, pixel intensity (or color). Yet another image segmentation technique involves "region growing," in which connected components are grown around seed point pixels known to reside within structures of interest.

Continuing the example, threshold-based segmentation can be applied to an x-ray image such that pixels whose intensities are above, say, 200 (out of 255) are labelled as barium-containing digestive organs and all other pixels are labelled as background. If the pixel intensities of the former are uniformly adjusted to a common value of, say, 255, and the pixel intensities of the latter are uniformly adjusted to, say, 0, the resulting "segmented" image, with only two levels of intensity values (0 and 255) is often more readily interpreted by man and machine alike.

An object of the invention is to provide improved methods and apparatus for digital data processing.

A related object is to provide such improved methods and apparatus for the visualization of image data.

A still further related aspect of the invention is to provide such methods and apparatus as can be applied in medical imaging, microscopy, geophysics, non destructive testing, and other imaging applications.

SUMMARY OF THE INVENTION

The invention provides methods and apparatus for image processing that perform image segmentation on data sets in two- and/or three-dimensions so as to resolve structures that have the same or similar grey values (and that would otherwise render with the same or similar intensity values) and that, thereby, facilitate visualization and processing of those data sets.

Such methods and apparatus can be used, for example, to apply different visualization parameters or rendering methods to different structures or regions of the data set, including completely hiding one or more of those regions. In particular, for example, aspects of the invention provide methods and apparatus for medical imaging that automatically extract bone structures in computed tomography (CT) 3D run-off studies without removing vessel structures (although those vessel structures may have the same or similar grey values). Further aspects of the invention provide for automatic removal of these and/or other structures shown in 3D (and other dimensional) images generated by other medical imaging techniques.

Thus, in one aspect, the invention provides a method for processing one or more two-dimensional (2D) image slices of a three-dimensional (3D) volume. The method includes the steps of identifying a region of the 3D volume to which the 2D image belongs, and performing segmentation on the 2D image to identify connected components. The method further calls for labeling pixels of those connected components based on geometric characteristics (e.g., shape and/or size), where such labeling is based on a volumetric region to which the 2D image belongs. By way of example, methods of the invention can be applied to processing 2D image "slices" generated via computed tomography, e.g., in medical imaging. For these purposes, the "region" is a region of the patient's body.

Related aspects of the invention provide such methods wherein the step of identifying the region to which the 2D image belongs includes computing a histogram of the image and comparing it with one or more other histograms, e.g., from an atlas of average histograms previously determined for the 3D volume (such as, for example, an atlas of average CT histograms for the human body). The image can be assigned, for example, to the region of the 3D volume associated with the best-matching histogram from the atlas. In instances where multiple 2D images are assigned to regions, the method can include checking those assignments for consistency and re-assigning one or more 2D images to another region, as necessary.

Still further related aspects of the invention provide such methods wherein the step of identifying the region to which the 2D image belongs includes determining additional information about the 2D image by performing threshold segmentation and determining therefrom any of (a) a number of connected components in the resulting image and/or (b) a total area occupied by selected structures and/or types of structures (e.g., body tissues). Alternatively, or in addition, the step of determining additional information can include computing a histogram of selected structures (e.g., a histogram of a region within the body and/or a region covered by body tissues).

Other aspects of the invention provide methods as described above in which the step of performing segmentation on the 2D image includes performing a threshold segmentation to label identically pixels representing the structures of interest. When such methods are applied to processing CT images, for example, such structures may be vasculature (e.g., blood vessels) and bone.

Such methods can, according to related aspects of the invention, include identifying connected components in the 2D image, following threshold segmentation, and relabeling pixels as differing types of structures of interest (e.g., vasculature versus bone, and vice versa) based on geometric properties of those connected components, e.g., in the context of the (body) region to which the 2D image has been assigned.

Still further related aspects of the invention provide such methods in which the step of performing segmentation on the 2D image to identify and label connected components based on their geometric characteristics includes performing such segmentation with increasingly larger thresholds to identify connected components that separate, as a result, into multiple components. When this is detected, the method calls for relabeling as differing types of structures of interest (again, by way of example, vasculature versus bone, and vice versa) making up those separated components.

Still further aspects of the invention provide methods as described above that include performing segmentation on a 3D data set formed from the plurality of the 2D images so as to label voxels representing the structures of interest (e.g., vasculature versus bone). According to these aspects of the invention, such segmentation can include flood-filling the 3D data set from one or more seed points placed at voxels in such structures of interest.

Flood-filling can proceed with increasing voxel intensity ranges until a connected component or region created thereby overextends. In related aspects of the invention, flood-filling is terminated when a connected component formed thereby either (i) stair-steps, or (ii) overruns a seed point placed in a voxel representing another structure of interest.

According to still further related aspects of the invention, the method calls for using model-based detection to find structures of interest in the 3D data set. And, yet, in still further related aspects of the invention, pixels corresponding to voxels labeled using such 3D segmentation are not relabeled if and when 2D segmentation of the type described above is performed.

These and other aspects of the invention are evident in the drawings and the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Overview

Figure 1A:
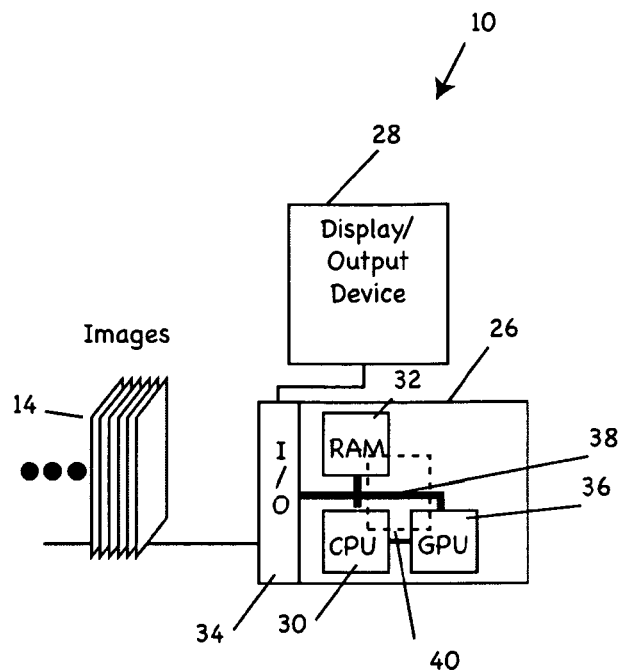
FIG. 1A depicts a digital data processing environment of the type in which the invention is practiced.

Described below are methods and apparatus for image processing according to the invention. These may be realized on workstations, personal computers, and other digital data processing systems of the type known in the art and used for image processing and/or reconstruction, an example of which is provided in FIG. 1A.

The system 10 includes a central processing unit (CPU) 30, dynamic memory (RAM) 32, and I/O section 34, all of the type known in the art, as adapted in accord with the teachings hereof. The digital data processor 26 may be coupled, via I/O section 34, with an image source (not shown), as well as with a monitor or other presentation device 28 on which images processed by system 10 may be displayed. I/O section 34 can also provide coupling to other apparatus (e.g., storage devices) and/or networks to which processed images can be transmitted for storage, displayed or otherwise. Illustrated digital data processor 26 may also include one or more graphical processing units (GPUs) 36, or other hardware acceleration devices, to facilitate execution of the methods described herein, though, such is not a requirement of the invention. Moreover, although digital data processor 26 is shown here has a stand-alone device, in other embodiments, it may be arranged otherwise, e.g., as an embedded processor.

The image source generates or otherwise supplies a plurality of images 14 for segmentation. In the illustrated embodiment, these represent, individually, two-dimensional (2D) "slices" of a three-dimensional (3D) volume. Indeed, in the example discussed below, they represent axial slices of a computed tomography (CT) scan of a patient's body, or portion thereof. More generally, however, images supplied by source 12 may derive from any number of technical pursuits, medical and non-medical alike, such as, by way of non-limiting example, microscopy, geophysics, non destructive testing, and so forth. Furthermore, although referred to as such in the illustrated embodiment, in other embodiments "images" 14 may comprise two-dimensional slices of data of any nature that make up the 3D volume.

Figure 1B:
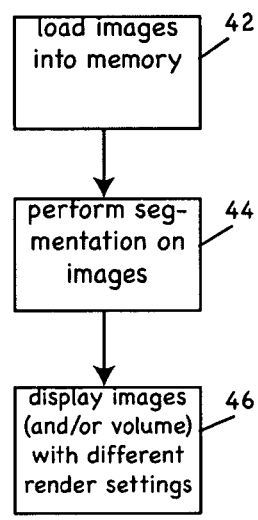
FIG. 1B overviews a method according to the invention.

FIG. 1B overviews operation of the system 10 and, more particularly, of computer software 40 executing thereon for purposes of segmenting images 14. Although such methods according to the invention are implemented in computer software (or, a "computer program") in other embodiments, such apparatus and/or methods may be implemented solely in hardware, in firmware or otherwise.

Referring to the drawing, the system 10 and, more particularly, the software 40 executes the following operations:
[0035] First the image data is loaded into main memory 32 of the computer 26. See, step 42. This can be effected all at once or in stages, e.g., as image data from the respective slices is needed for processing. In the illustrated embodiment, that image data comprises the plurality of 2D images 14 that make up a 3D volume (hence, the image data is referred to as a "3D data set"). In other embodiments, processing is performed on only a single individual 2D image.

Then, specific structures represented in the images are segmented, i.e., pixels (and voxels) belonging to those structures are marked (or "labeled") in a suitable data structure in memory 32. See, step 44. In instances where the images 14 are from medical imaging apparatus, the structures can be, for example, anatomical structures. The data structure may comprise any collection of data elements (e.g., an array, struct, linked list, etc.) of the type known in the art (as adopted for use herewith) suitable for holding labels that designate structures to which the pixels and/or voxels belong.

Then the processed image data is displayed, e.g., on output device 28, using different rendering settings for the different structures. See step 46. In other embodiments, the processed image data may be subjected to still further processing on device 26, before, after, or in lieu of display. Alternatively, or in addition, it may be transmitted elsewhere (e.g., to other equipment and/or locations) for storage, processing, and/or display.

Figure 3:
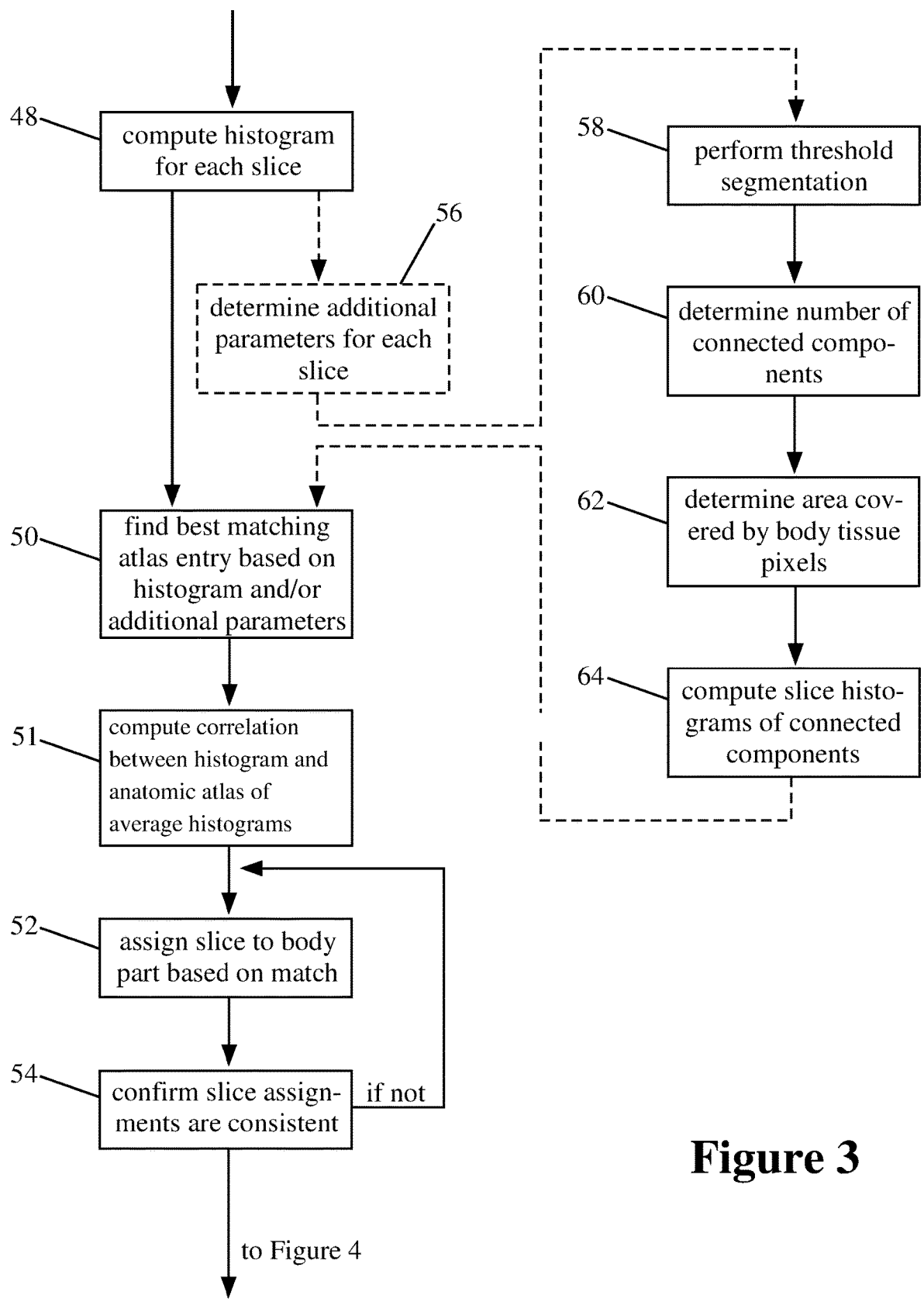
FIG. 3 depicts a method according to the invention for assigning a 2D image slice to a volumetric region.
Figure 4:
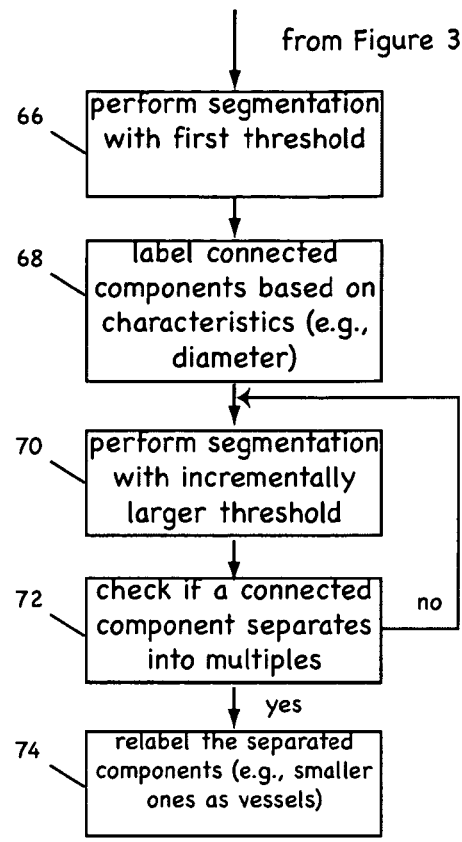
FIG. 4 depicts a method according to the invention for 2D segmentation.
Figure 5:
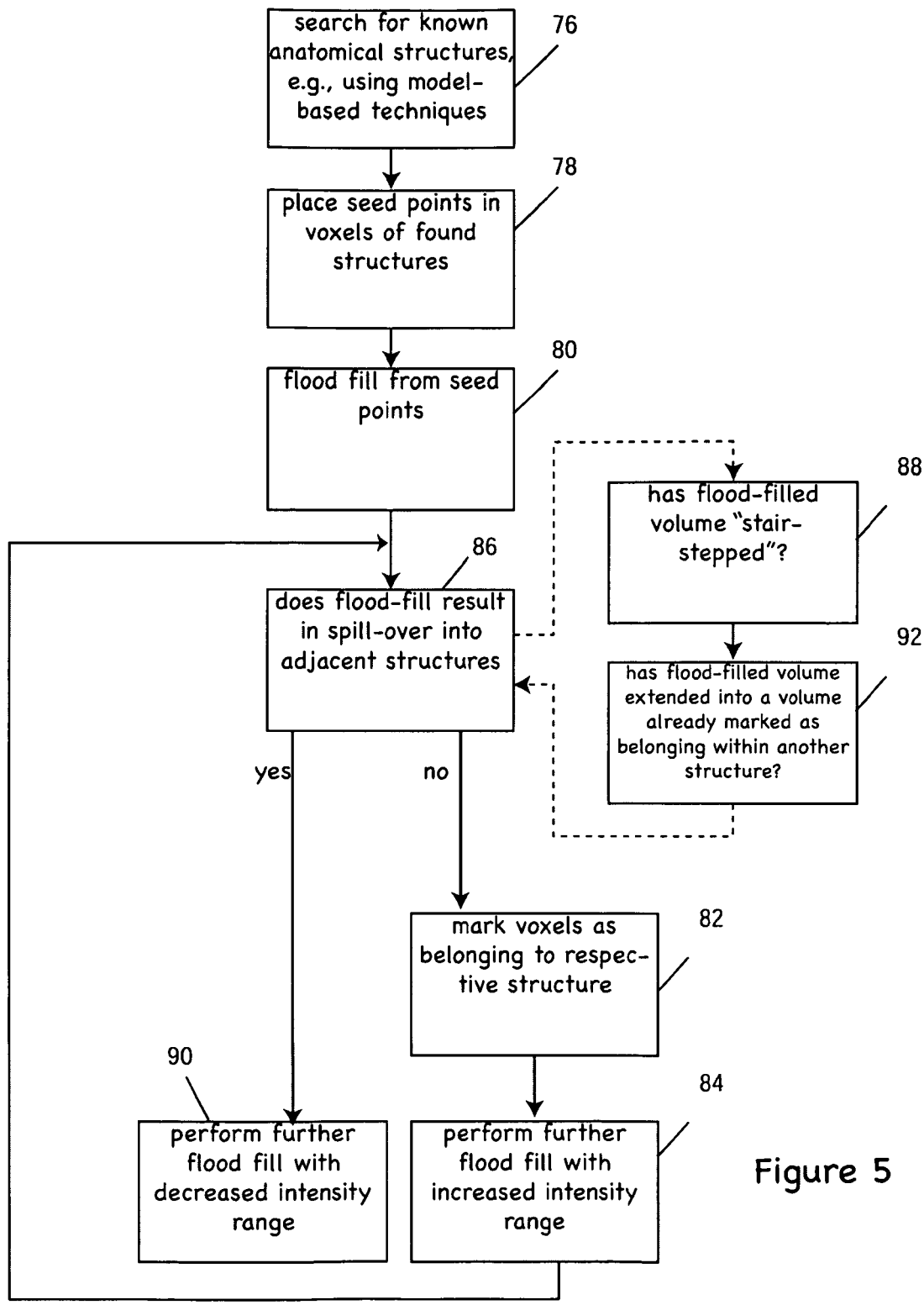
FIG. 5 depicts a method according to the invention for 3D segmentation.

FIGS. 3-5 depict further details of the processing effected in step 44. The discussion of those figures below uses, as an example, segmentation of bone and blood vessels in the images 14, e.g., to enable the former to be removed during display of the segmented images in step 46. However, as noted above, it will be appreciated that the invention can be used for a variety of other purposes and in a variety of other applications.

To understand the example, it will be appreciated that, often, CT studies use contrast agent to visualize the blood vessels. In such cases the blood vessels appear bright in the CT images, similar to bone structures. When rendering the image in maximum intensity projection mode (MIP), then the bright bone structures will often occlude the vessel structures which are typically much thinner than bone. However since both contrasted vessels and bone have the same or similar intensity values, standard rendering methods to distinguish them, such as assigning different transparency values based on intensity, will fail. Apparatus and methods according to the invention resolve this, allowing for the segmentation of structures represented in images 14—i.e., structures that would otherwise render with the same or similar intensity values—so that they may be rendered (and/or processed) differently from one another.

Figure 2:
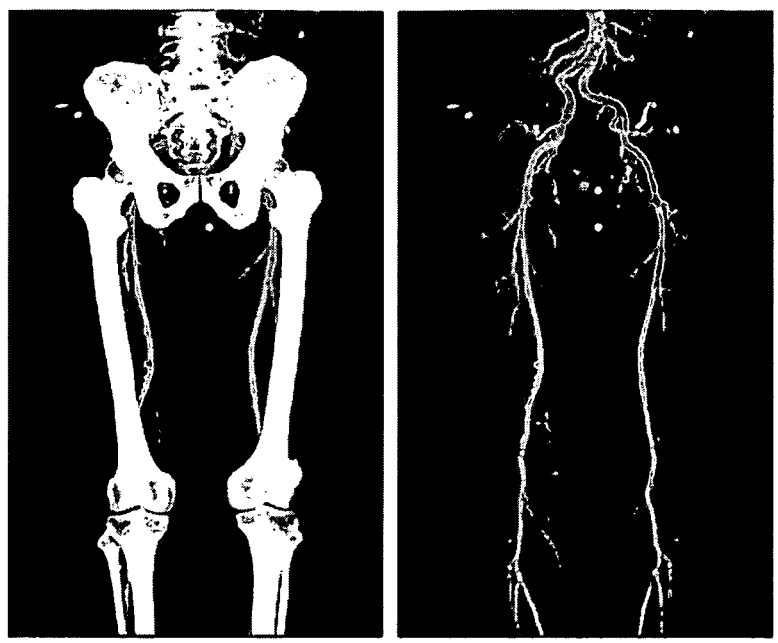
FIG. 2 depicts a result of segmentation of a data set of images utilizing two-dimensional and/or three-dimensional segmentation-based methods according to the invention.

In the example that follows, those methods are applied to segment pixels representing bone differently from those representing blood vessels so that they can be rendered differently and, particularly, so that the bone can be rendered invisibly in step 46. FIG. 2 illustrates the result of executing such a method. In the left hand half of the figure a maximum intensity projection (MIP) of a CT runoff study is shown. Most of the vascular structure is hidden by the bone. In the right hand half of the figure voxels belonging to bone were segmented using methods of the invention and then left out in the rendering, thus, revealing the vessel structure. Note that in the discussion that follows, the images 14 are referred to, individually, as "slices," "2D slices," or the like and, collectively, as the "data set," "3D data set," or the like.

Identifying Body Regions

Referring to FIG. 3, the illustrated method first identifies volumetric regions to which the respective image slices 14 belong. In the example, these are body regions, i.e., ranges of successive slices corresponding to certain anatomy, such as foot, lower leg, knee, upper leg, hip, lower abdomen, lung. This is done as follows:

A histogram is computed for each slice of the data set. See step 48. The histogram is computed in the conventional manner known in the art.

The histograms are then used to determine which volumetric regions the respective slices belong to. In the example, the histograms are compared with an anatomic atlas containing average histograms for the different body regions. See step 50. For each of the slices a correlation such as a cross-correlation is computed between the slice histogram and said atlas of average histograms in order to determine which body part's histogram the slice most closely matches and therefore most likely belongs to. See step 51. The slice is then assigned to the respective body part. See step 52.

Once all (or a subset of all) of the slices have been assigned, then it is checked whether the individual slice assignment is consistent with the overall volumetric region to which they pertain. In the example, the slice assignments are checked to insure that they are consistent with human anatomy, e.g. in the above example, there can only be one range of slices assigned to each of the body regions such as "lower leg" and the body regions must be ordered in the correct spatial order. See step 54.

If inconsistencies are detected, slices are re-assigned to different volumetric regions—in the example, body regions—to obtain a consistent overall assignment. In many instances, multiple different sets of slices could be chosen for re-assignment in order to achieve overall consistency. Preferably, methods and apparatus according to the invention choose the one which re-assigns the smallest number of slices possible to achieve consistency.

As those skilled in the art will appreciate, additional criteria (or parameters) can be utilized to match slices to atlas entries—or, more generally, to determine which volumetric regions the respective slices belong to. This is illustrated in steps 56-64. Generally speaking, this involves performing a threshold segmentation on each slice and, then, determining (a) the number of connected components in the image and/or (b) the total area occupied by pixels representing structures and/or types of structures of interest (in the example, body tissues). It may also involve computing a second histogram for the latter, i.e., structures of interest (e.g., pixels within the body).

More particularly, by way of example, in the illustrated embodiment additional parameters for processing axial slices of a CT scan, e.g., for segmentation of bone and blood vessels, can be computed in a manner such as the following:

A threshold segmentation is performed in each slice with a threshold of −1000 HU (Hounsfield Units) which separates body tissue from air. See step 58. The number of connected components in the threshold segmented image is computed, as well as the total area covered by body pixels. See steps 60-62. A second histogram (subsequently referred to as Body Histogram) is computed for each slice which only takes into account pixels inside the body, i.e., enclosed in a connected component in said threshold segmented image. See step 64. It will be appreciated that, in some applications, the threshold used to separate body tissue from air may vary (e.g., from about −1000 HU to other values) and that, in other embodiments, still other thresholds are used, e.g., to distinguish among other structures and/or types of structures of interest.

The additional information determined for each slice following threshold segmentation (in step 58)—namely, the number of connected components, the total area occupied by structures of interest (e.g., body tissue), and/or a histogram of those structures—can be used along with (or instead of) the slice histogram computed in step 48, to determine volumetric regions (e.g., body regions) to which the respective image slices 14 belong.

In the example, the additional information is used to assign slices to body regions and/or anatomical structures using criteria such as, for example, "slices which have a significant number (>25%) of air pixels (pixels with intensity ←1000 HU) are assigned to lung" or "the number of connected components in slices in region lower leg is two" or "the knee region is between 2 cm and 20 cm in size". Adding such criteria can make the illustrated method and apparatus more robust and/or more efficient. The exact selection of criteria is application- and image-set dependent: for example a criterion like "the number of connected components in slices in region lower leg is two" should not be chosen if one-legged patient data are to be processed.

Performing Segmentation in Slices

Once the slices have been assigned to volumetric regions (in the example, body regions), 2D segmentation is performed to identify connected components of potential interest (bone and vessel) and their pixels labelled (or categorized) based on geometric characteristics. In the example, this differentiates pixels depicting bone from blood vessels, though, in other applications it may differentiate pixels depicting other structures from one another. In that light, it will be appreciated that some of the algorithms discussed below are specific to bone/vessel segmentation and that different algorithms and/or thresholds may be employed in different applications. Moreover, even in the context of bone/vessel segmentation, the algorithms may vary within different regions of the body as will be described in the following.

In each slice, a threshold segmentation is performed using a first threshold. See step 66. A value is chosen so as to result in identical labeling of pixels representing the structures of interest (in the example, bones and blood vessels), yet, different labeling for structures that are not of interest (e.g., organs). In the example, this is a threshold of 130 HU—though it will be appreciated that different threshold values (e.g., those of about 130 HU or otherwise) can be used depending on the acquisition protocol and user input. As noted, this segmentation will label both, bone and vessels.

In the next step, connected components in each slice are (re-)labelled based on their geometries characteristics (e.g., size and/or shape). This labeling is preferably done in the context of the volumetric region to which the respective slice is assigned. See step 68. Bones normally have a greater diameter than vessels. Therefore, in the example, after said threshold segmentation all connected components with an area greater than the diameter of the largest vessel which can occur in the respective body region is assigned to bone, all others are assigned to vessel. As noted, this may be further qualified by the context of the body region to which the slice is assigned. Thus, in the leg, except for the knee region, one can add the additional constraint that only the largest connected component (upper leg) or the two largest connected components (lower leg) are to be considered bone. Caution is required when cases are to be processed in certain applications were pathologies are present which could violate those latter criteria, such as patients with bone fractures.

Figure 6:
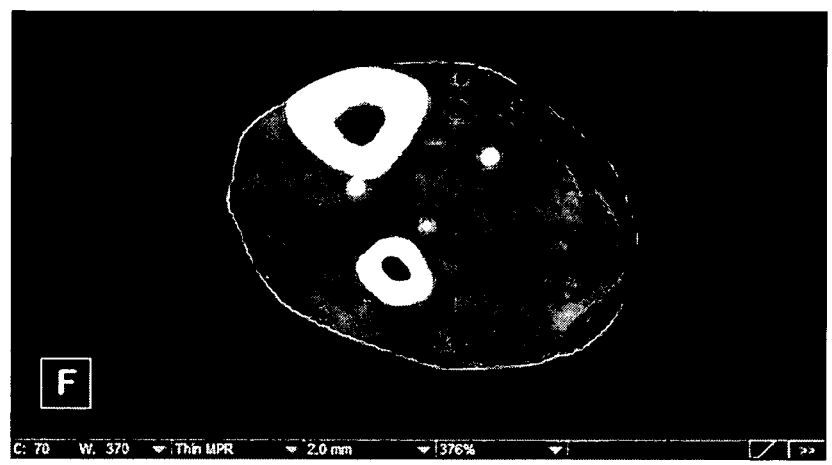
FIGS. 6-8 depict a melding and segregation of structures in an image subject to 2D segmentation according to the invention.
Figure 7:

Sometimes the structures that will ultimately be differentiated (in the example, bones and blood vessels) run very close to one another. In such cases, in some slices the cross section of one structure (e.g., the bone) and of another structure (e.g., the vessel) near it may actually appear melted into one connected component in the threshold segmentation generated in step 66. This is illustrated in FIG. 6, which shows part of an axial slice in the lower leg. The two bones and some vessels can be clearly seen as bright spots. FIG. 7 shows a threshold segmentation with a certain threshold (268 HU). As can be seen, one vessel which runs close to the upper bone appears to be connected in this segmentation. Therefore if the whole connected component was selected as bone, then that piece of the vessel would be segmented incorrectly.

Figure 8:

The method used to prevent that is illustrated in steps 70-74 and involves performing segmentation with increasingly larger thresholds, checking after each successive segmentation to see if another otherwise seemingly connected component separates into multiple components and, if so, relabeling the separated components as different structures. Application of this to the example follows:

Assume that a connected component is identified as bone in one slice. We will refer to (and label) the set of pixels comprising this component as B. Now the threshold is increased from the first or original threshold—in this case, 130 HU—in steps of 1 HU up to 400 HU. See step 70. Of course, it will be appreciated that other step sizes may be used. When increasing the threshold, the segmented bone structure shrinks. Often, in the case of a melted vessel/bone structure, the vessel will separate in the course of this process. This can be seen in FIGS. 7 and 8. While in FIG. 7 the vessel and the upper bone are still connected, in FIG. 8 with a higher threshold, they are separated.

After each increase of the threshold it is checked whether a connected component previously identified as bone gets separated into multiple components, a large one and one and a small one. See step 72. Once that happens, the smaller component is labelled as vessel. See step 74. We label the set of pixels comprising said smaller component as V and the set of pixels comprising said larger component as B*.

In the original segmentation with the first threshold (here, 130 HU), all pixels belonging to B are now reassigned according to the following criterion: Any pixel which is part of B* remains bone. Any pixel which is part of V is assigned to vessel, i.e. removed from B. Any pixel which is neither part of B* nor V is re-assigned to vessel if it is closer to V than to B*. The distance of a pixel p to a set of pixels S is defined to be the shortest distance between p and any of the pixels belonging to S.

Performing Segmentation in 3D

In addition to (or in lieu of) performing segmentation on the 2D image slices 14 as described above, methods and apparatus according to the invention performs segmentation on 3D data sets formed from those slices utilizing flood-filling (or region growing). This permits labeling voxels representing structures of interest (e.g., those representing bone and blood vessels) and, as a consequence, provides further basis for differentially labeling the corresponding voxels (and pixels).

By way of overview, this 3D segmentation involves placing seed points in voxels which are known to represent structures of interest and flood-filling from those seed points to mark connected components belonging to the same respective structures. The voxel intensity range for the flood-fill is gradually increased until the connected components—in this case, regions or volumes—formed thereby stair-step or overrun seed points for other structures.

An advantage of 3D segmentation (used alone or in connection with 2D segmentation) is that it can take advantage of structures that are more readily identifiable in 3D (i.e., across multiple slices) than in individual 2D slices. For example, in the abdominal and lung region, blood vessels like the aorta may have diameters larger than some of the thinner bone structures. While the procedures discussed in the preceding section might therefore result in the aorta being marked as vasculature, and vice versa, use of 3D segmentation in accord herewith circumvents the problem.

Therefore in the illustrated embodiment the above described 2D method is extended as follows using a three dimensional approach: Seed points are placed in voxels which are known to be either bone or vessel. Then from these seed points a flood fill is started to mark connected voxels belonging to the same structure. Measures are taken to avoid the flood fill from "spilling over" from vessel into bone structures or vice versa.

In the example this is implemented as follows: Anatomic structures in the pelvic and abdomen region are searched which can be easily found with model based detection methods. See, step 76. For example the aorta is a tubular structure with a known diameter range, always rather centered and always located in front of the spine structure. Also the pelvis bone can be located by searching in the pelvic region for the largest 3D-connected component.

Once those components are identified, seed points can be placed into these objects. See, step 78.

Then from these seed-points a flood-fill algorithm is started. See, step 80. The flood-fill first uses a very conservative intensity range meaning that only voxels with an intensity very similar to the seed points are marked. See step 82. Then, the range is grown to fill/mark more voxels belonging to the same anatomic structure. See, step 84. If the range was made too wide, the flood-fill could erroneously spread out into a spatially close structure. This is the reverse process of the above described melting/separation problem for vessels running near bones. For example with a seed point placed in the aorta, the flood fill could spill over into the spine if the range was chosen such that those two structures would meld. This must be avoided. To do so, step 86 is executed and a number of criteria are evaluated while growing the intensity range.

(i) If the volume filled by the flood fill stair steps, when continuously increasing the range, then it must be assumed that the flood-fill has spilled over and the range is reduced again. See, steps 88 and 90.

(ii) If the flood fill reaches a voxel which is marked as a seed point for a different structure then also it must be assumed that the range is too wide and the range is reduced again. See, steps 90 and 92. For example if a flood fill is started at a seed point in the aorta and it reaches a point marked bone in the pelvis, then the range was obviously chosen such that the vessel tree and the bones are connected relative to this range. Therefore this range must be rejected and narrowed.

Any voxels which are marked by the above method can be marked bone or vessel respectively, depending on which seed point they were connected to (or grown from). The pixels correspond to such voxels do not need to be re-labeled when this method is combined with the slice based segmentation described above.

Following segmentation of a data set of images 14 utilizing two-dimensional and/or three-dimensional segmentation in the manner discussed above, the data set (and/or individual images 14 contained therein) can be displayed on output device 28. Different rendering settings can be set for the structures labelled by such segmentation, e.g., to facilitate visualization. For example, as shown on the right side of FIG. 2 and discussed above, voxels labelled as bone can be rendered invisibly, while voxels labelled as blood vessels can be rendered in MIP mode. Of course, other display settings can be used instead, e.g., with blood vessels rendered in one color and bone in another color, and so forth. Moreover, as noted above, the data set may be subjected to still further processing on device 26, before, after, or in lieu of display. Alternatively, or in addition, it may transmitted elsewhere (e.g., to other equipment and/or locations) for storage, processing, and/or display.

The embodiments described herein meet the objects set forth above, among others. Thus, those skilled in the art will appreciate that the illustrated embodiment merely comprises an example of the invention and that other embodiments making changes thereto fall within the scope of the invention, of which we claim:

The invention claimed is:

1. A method of revealing vasculature in a CT runoff study comprising:
   (a) receiving a plurality of 2D image slices in a CT runoff study corresponding to an upper leg;
   (b) selecting a threshold to label one or more pixels as corresponding with a bone structure in the plurality of 2D image slices using a digital data processing system configured for image processing;
   (c) carrying out a threshold segmentation on a plurality of pixels in the plurality of 2D image slices using the threshold selected in step (b);
   (d) selecting a 2D image slice from the plurality of 2D image slices corresponding to the upper leg;
   (e) identifying one or more bone structure pixels in the upper leg in the 2D image slice based on the threshold segmentation;
   (f) determining an area of a largest connected component occupied by the one or more bone structure pixels in the 2D image slice;
   (g) assigning the area as the bone structure;
   (h) identifying one or more additional bone structure pixels in the area;
   (i) flood filling with the digital data processing system the one or more bone structure pixels and the one or more additional bone structure pixels to identify connected components of the bone structure, where a pixel is not assigned to the bone structure if a connected component formed by flood filling generates a stair-step effect;
   and
   (j) removing the bone structure from the 2D image slice in order to reveal vasculature using the digital data processing system configured for image processing.

2. The method of claim 1, where a pixel is not assigned to the bone structure when the pixel is assigned to vasculature.

3. The method of claim 1, where a pixel of the plurality of pixels is not assigned to the bone structure based on an intensity of the pixel below the threshold.

4. The method of claim 1, where a pixel of the plurality of pixels is assigned to the bone structure based on an intensity of the pixel above the threshold.

5. The method of claim 1, where the threshold is between:
   a lower limit of 130 Hounsfield Units (HU); and
   an upper limit of 400 HU.

6. The method of claim 5, where steps (b) through are repeated with an incrementally increased threshold.

7. The method of claim 6, where the threshold is increased by 1 HU.

8. The method of claim 1, further comprising labeling as one or more additional bone structure pixels one or more pixels adjacent one or more bone structure pixels.

9. The method of claim 1, further comprising labeling as one or more additional bone structure pixels based on connectedness of one or more bone structure pixels.

10. The method of claim 1, further comprising labeling as one or more additional bone structure pixels one or more pixels based on one or more geometric characteristics selected from the group consisting of shape of the bone structure in the 2D image slice and size of the bone structure in the 2D image slice.

11. The method of claim 1, where the threshold is between:
a lower limit of −1000 Hounsfield Units (HU); and
an upper limit of 400 HU.

12. The method of claim 1, where at least a first pixel of the plurality of pixels with an intensity below the threshold is set to an intensity of 0, where at least a second pixel of the plurality of pixels with an intensity above the threshold is set to an intensity of 255.

13. A method of revealing vasculature in a CT runoff study comprising:
(a) receiving a plurality of 2D image slices in a CT runoff study corresponding to a lower leg;
(b) selecting a threshold to label one or more pixels as corresponding with a bone structure in the plurality of 2D image slices using a digital data processing system configured for image processing;
(c) carrying out a threshold segmentation using the threshold selected in step (b) on a plurality of pixels in the plurality of 2D image slices;
(d) selecting a 2D image slice from the plurality of 2D image slices corresponding to the lower leg;
(e) identifying one or more bone structure pixels in the lower leg in the 2D image slice based on the threshold segmentation;
(f) determining an area of one of two largest connected components occupied by the one or more bone structure pixels in the 2D image slice;
(g) assigning the area as the bone structure;
(h) identifying one or more additional bone structure pixels in the area;
(i) flood filling with the digital data processing system the one or more bone structure pixels and the one or more additional bone structure pixels to identify connected components of the bone structure, where a pixel is not assigned to the bone structure if a connected component formed by flood filling generates a stair-step effect;
and
(j) removing the bone structure from the 2D image slice in order to reveal vasculature using the digital data processing system configured for image processing.

14. The method of claim 13, further comprising labeling as one or more additional bone structure pixels one or more pixels neighboring one or more bone structure pixels.

15. The method of claim 13, further comprising labeling as one or more additional bone structure pixels based on connectedness of one or more bone structure pixels.

16. The method of claim 13, further comprising labeling as one or more additional bone structure pixels one or more pixels based on one or more geometric characteristics selected from the group consisting of shape of the bone structure in the 2D image slice and size of the bone structure in the 2D image slice.

17. A method of revealing vasculature in a CT runoff study comprising:
(a) receiving a plurality of 2D image slices in a CT runoff study measured with a contrast agent corresponding to an anatomical region, where the anatomical region is lower leg and upper leg;
(b) selecting a threshold to label one or more pixels as corresponding with a bone structure in the plurality of 2D image slices using a digital data processing system configured for image processing;
(c) carrying out a threshold segmentation using the threshold selected in step (b) on a plurality of pixels in the plurality of 2D image slices;
(d) selecting a 2D image slice from the plurality of 2D image slices corresponding to the anatomical region;
(e) identifying one or more bone structure pixels in the anatomical region in the 2D image slice based on the threshold segmentation;
(f) determining an area of one of three largest connected components occupied by the one or more bone structure pixels in the 2D image slice;
(g) assigning the area as the bone structure;
(h) identifying one or more additional bone structure pixels in the area;
(i) flood filling with the digital data processing system the one or more bone structure pixels and the one or more additional bone structure pixels to identify connected components of the bone structure, where a pixel is not assigned to the bone structure if a connected component formed by flood filling generates a stair-step effect; and
(j) removing the bone structure from the 2D image slice in order to reveal vasculature using the digital data processing system configured for image processing.

18. The method of claim 17, further comprising labeling as one or more second additional bone structure pixels one or more pixels neighboring one or more bone structure pixels.

19. The method of claim 17, further comprising labeling as one or more second additional bone structure pixels based on connectedness of one or more bone structure pixels.

20. The method of claim 17, further comprising labeling as one or more second additional bone structure pixels one or more pixels based on one or more geometric characteristics selected from the group consisting of shape of the bone structure in the 2D image slice and size of the bone structure in the 2D image slice.

* * * * *